(12) United States Patent
Happel

(10) Patent No.: US 8,142,666 B1
(45) Date of Patent: Mar. 27, 2012

(54) BAFFLE BOX DEFLECTORS AND FLOW SPREADERS

(76) Inventor: Tom Happel, Cocoa, FL (US)

( * ) Notice: Subject to any disclaimer, the term of this patent is extended or adjusted under 35 U.S.C. 154(b) by 158 days.

(21) Appl. No.: 12/614,077

(22) Filed: Nov. 6, 2009

Related U.S. Application Data

(60) Provisional application No. 61/119,095, filed on Dec. 2, 2008.

(51) Int. Cl.
*E03F 5/14* (2006.01)
(52) U.S. Cl. ............... 210/747.2; 210/801; 210/170.03; 210/519; 210/521; 210/532.1
(58) Field of Classification Search ............ 210/747.2, 210/747.3, 801, 155, 162, 170.03, 519, 521, 210/532.1
See application file for complete search history.

(56) References Cited

U.S. PATENT DOCUMENTS

| | | | | |
|---|---|---|---|---|
| 3,527,348 | A * | 9/1970 | Lalonde et al. | 210/801 |
| 4,326,952 | A * | 4/1982 | Blake | 210/521 |
| 4,422,931 | A * | 12/1983 | Wolde-Michael | 210/519 |
| 4,738,644 | A | 4/1988 | Happel | |
| 5,670,039 | A * | 9/1997 | Harris | 210/521 |
| 6,077,448 | A * | 6/2000 | Tran-Quoc-Nam et al. | 210/532.1 |
| 6,099,743 | A * | 8/2000 | Pedersen | 210/801 |
| 6,428,692 | B2 * | 8/2002 | Happel | 210/162 |
| 6,638,424 | B2 * | 10/2003 | Stever et al. | 210/170.03 |
| 6,979,148 | B2 | 12/2005 | Happel et al. | |
| 7,270,747 | B2 | 9/2007 | Happel et al. | |
| 7,294,256 | B2 | 11/2007 | Happel et al. | |
| 2003/0121846 | A1 * | 7/2003 | Use et al. | 210/521 |
| 2004/0222159 | A1 * | 11/2004 | Peters, Jr. et al. | 210/747 |
| 2006/0096935 | A1 * | 5/2006 | Harding | 210/801 |
| 2006/0207922 | A1 | 9/2006 | Dussich | |

* cited by examiner

*Primary Examiner* — Christopher Upton
(74) *Attorney, Agent, or Firm* — Brian S. Steinberger; Law Offices of Brian S. Steinberger, P.A.

(57) ABSTRACT

Devices, apparatus, systems and methods of using baffle boxes with turbulence deflectors and flow spreaders. Turbulence deflectors are added about the inlet port of a baffle box, and a flow spreader is added centrally beneath an outlet port to increase removal efficiency of pollutants and prevent the conveyance of pollutants down stream. The turbulence deflectors and the flow spreader will increase the removal efficiency of particles, especially fine and ultra fine particles without impeding the water flow. The turbulence deflectors will significantly reduce the turbulence within the sediment chambers which will lead to better settling and less re-suspension. The flow spreader spreads the flow wide sooner within the baffle box to reduce the linear velocity of the water current, and directs water flow away from the area of greatest turbulence adjacent to the inflow, and will increase the settling of particles and minimize re-suspension. By increasing the removal efficiency of the first sediment chamber the shielding will prevent the re-suspension of fine and ultra fine particles.

20 Claims, 13 Drawing Sheets

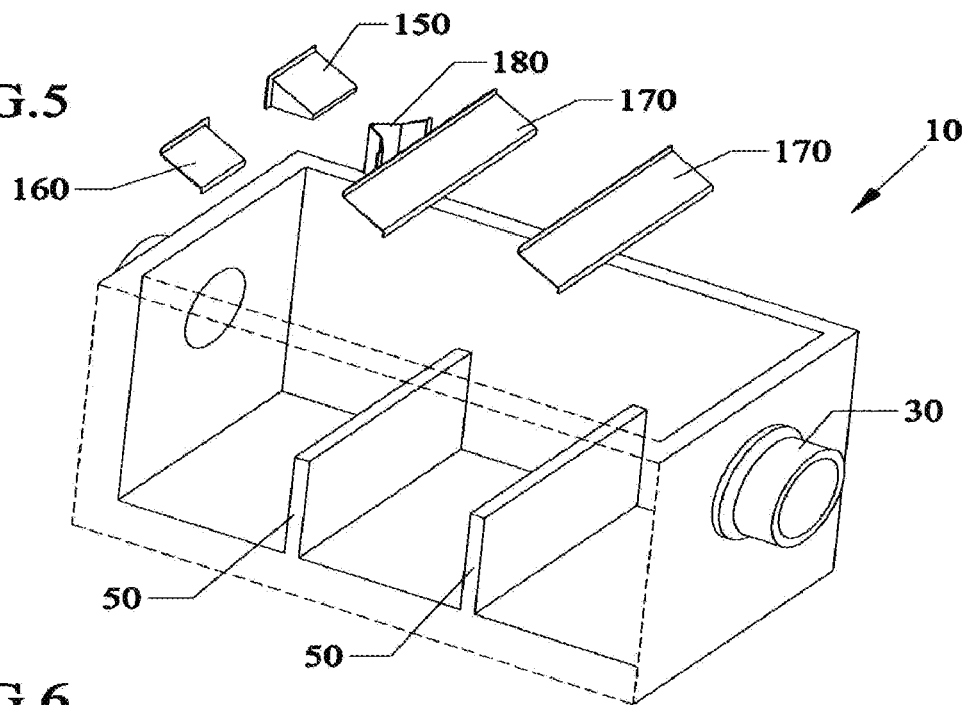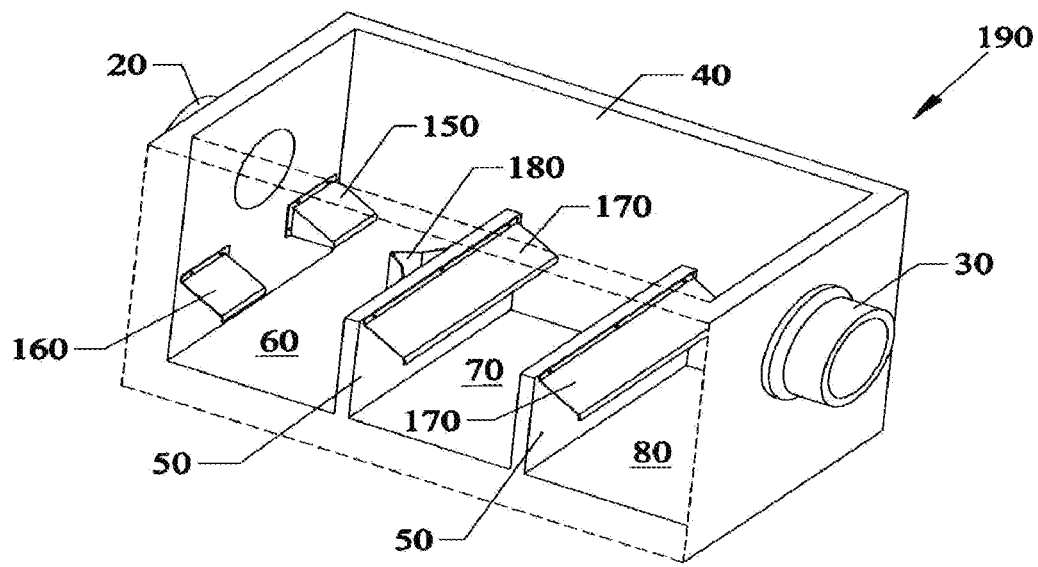

BAFFLE BOX DEFLECTORS AND FLOW SPREADERS

This invention claims the benefit of priority to U.S. Provisional Patent Application No. 61/119,095 filed Dec. 2, 2008.

FIELD OF INVENTION

This invention relates to storm water baffle boxes, in particular to devices, apparatus, systems and methods of using baffle boxes with turbulence deflectors and flow spreaders.

BACKGROUND AND PRIOR ART

Storm water pollution is often conveyed into our environments from various sources such as from storm water entering lakes and rivers. This type of pollution can threaten the stability of our ecosystems, and the water resources that man's society depends on. Storm water pollution is often referred to a non-point source pollution because its source is everywhere that rain falls. However, storm water is often concentrated in storm drain pipes for conveyance which is a convenient point of applied treatment. Sediments are heavier than water and many of the targeted chemical pollutants readily attach to sediments. Storm water pipes are used for sediment transport as well as water. Sediments that are smaller in size have a higher concentration of these chemical pollutants than larger particles.

A storm water treatment system that can capture very fine sediments such as silt and clay will be more effective than a treatment system that is limited to medium and coarse size sediments. In modern day permitting practices of water sheds, requirements for more demanding pollutant removal efficiencies, and technology that increases the efficiency of storm water treatment will more than likely be required and an important part of the solution. Currently, capturing very fine sediment particles is not able to be easily achieved in current storm water treatment systems.

FIG. 1 is an upper perspective view of a conventional baffle box 10. FIG. 2 is another perspective view of the baffle box 10 of FIG. 1 with cut-away face wall. FIG. 3 is a top view of the conventional baffle box 10 of FIGS. 1-2 with water flow lines. FIG. 4 is a side sectional view of the conventional baffle box 10 of FIG. 3 along arrows 4A with flow lines over the baffles and circulating loop currents within the sediment chambers.

Referring to FIGS. 1-4, a conventional baffle box 10 can include an inlet pipe 20 entering into one end of a baffle box case 40, and an outflow pipe 30 exiting out the opposite end of the box case 40. Inside of the case 40 can be one or more baffles 50 that divide up various sediment chambers 60, 70 and 80.

Referring to FIGS. 3-4, water flows into the box 10 in the direction of arrow 90, and circulates in loops 110 inside of first sediment chamber 60, and flows over baffle 50 in the direction of arrow 120 into second chamber 70. The water then circulates again in loops 110 inside of second sediment chamber 70, and over another baffle 50 in the direction of arrow 120 into third sediment chamber 80 where it again circulates in loops 110, and then exits the box 10 through outflow pipe 30 in the direction of arrow 100. From the first sediment chamber 60 to the third sediment chamber 80, a gradual widening of the flow occurs while sediment 130 is at the bottom of box 10 below water level 140.

Baffle boxes are treatment structures that can treat the entire flow of a pipe and has the capability to capture particles that are heavier than water such as sediments. Baffle boxes are used to reduce the velocity of the water flow and reduces turbulence to calm the water which is conducive for the settling of suspended particles. Creating calm water and maximizing retention time within the baffle box will increase the removal efficiency. Although there many different configurations of baffle boxes, laboratory and field testing has yielded data that suggests an optimum configuration for a baffle box. A typical well designed conventional baffle box can have the following general characteristics:

1. Three equally size sediment chambers
2. The length of the vault will be approximately twice the width.
3. The inflow pipe, top of baffles and outfall pipe will be at the same elevation.
4. The inflow pipe size will not exceed half the width of the vault.

Referring to FIGS. 1-4, a majority of the captured sediments in a baffle box 10 will be in the first sediment chamber 60. The average sediment size in the second sediment chamber 70 will be smaller than in the first sediment chamber 60, and average sediment size in the third chamber 80 will be smaller than the sediment in the second sediment chamber 70. Smaller particles take longer to settle than larger particles. The greater the flow volume moving through a baffle box 10 the less the removal efficiency because there will greater turbulence and less retention time. During medium and large flows there is significant turbulence within the sediment chambers 60-80, which can prevent sediments from settling and re-suspend sediments that had been captured in a previous rain event. In larger flows rectangular current can form within the sediment chambers 60-80 and possibly flush most of the previously captured sediments out the end of the baffle box 10.

As water flow enters the baffle box 10 through the inflow pipe 20 the water current gradually spreads wide and down into the first chamber 60. As the current impacts against the first baffle 50 the current turns and flows down the face of the baffle 50. When the current reaches the bottom of the sediment chamber it impacts the sediment 130, agitating it, and then turns back toward the inflow flowing across the captured sediments 130 scouring and re-suspending these sediments. When the current reaches the wall just under the inflow it impacts the wall and turns flowing up the wall toward the inflow pipe 20 and carrying with it scoured sediments.

Finally, as the current merges into the inflowing water from the inflow pipe 20, sediments that had been previously settled across the bottom of the sediment chamber 60 are re-suspended into the highly turbulent inflowing water and are flushed further down the length of the baffle box. The sediments may settle again in the second sediment chamber 70 or third sediment chamber 80, or flush completely out the end of the baffle box 10 through the outflow pipe 30. This rectangular current is also present in the second chamber 70 and third chamber 80. However, the first chamber 60 has significantly greater turbulence than the other chambers 70, 80. This process repeats continuously during the rain event and will dramatically reduce the removal efficiency of the baffle box 10. Thus, the need exists for solutions to the above problems with the prior art.

SUMMARY OF THE INVENTION

A primary objective of the present invention is to provide enhanced baffle box apparatus, devices, systems and methods that use turbulence deflectors and flow spreaders to increase the removal efficiency of pollutants and reduce and prevent the conveyance of the pollutants downstream.

A secondary objective of the present invention is to provide enhanced baffle box apparatus, devices, systems and methods that use turbulence deflectors and flow spreaders to significantly reduce the turbulence within the sediment chambers which will lead to better settling and less re-suspension.

A third objective of the present invention is to provide enhanced baffle box apparatus, devices, systems and methods that use turbulence deflectors and flow spreaders to spread the flow wide sooner within the baffle box to reduce the linear velocity of the water current. It will also direct water flow away from the area of greatest turbulence adjacent to the inflow, and in doing so, function to increase the settling of particles and minimize re-suspension.

A fourth objective of the present invention is to provide enhanced baffle box apparatus, devices, systems and methods that use turbulence deflectors and flow spreaders to increase removal efficiency of in the sediment chamber(s) to prevent the re-suspension of fine and ultra fine particles.

By enhancing a conventional baffle box with turbulence deflectors and a flow spreader the removal efficiency of pollutants will increase and prevent the conveyance of pollutants down stream. Turbulence deflectors and a flow spreader will increase the removal efficiency of particles, especially fine and ultra fine particles without impeding the water flow.

The turbulence deflectors will significantly reduce the turbulence within the sediment chambers which will lead to better settling and less re-suspension.

The flow spreader will function to spread the flow wide sooner within the baffle box to reduce the linear velocity of the water current. It will also direct water flow away from the area of greatest turbulence adjacent to the inflow, and in doing so, function to increase the settling of particles and minimize re-suspension. By increasing the removal efficiency of the first sediment chamber the process of shielding will function to prevent the re-suspension of fine and ultra fine particles.

A preferred system for increasing efficiencies of storm water baffle boxes to remove pollutants, can include a baffle box having at least one sediment settling chamber with a baffle, with a raised inlet port for allowing storm water to pass into the baffle box, and a raised outlet port for passing flow from the storm water to pass out of the baffle box, an inflow deflector adjacent to the inlet portion of the baffle box beneath the inlet port for reducing turbulence of the storm water passing into the sediment chamber to allow for increased settling and less suspension of pollutant particulates, and a flow spreader in the at least one sediment chamber on the baffle for spreading the flow wide sooner within the baffle box to reduce linear velocity of the flow of the storm water.

The inflow deflector can include a pair of angled down deflectors on both sides of the inlet port. The flow spreader can include a funnel positioned adjacent a rear wall of the baffle box centrally located on the upstream of the baffle. The funnel flow spreader can have a triangular configuration.

The system can further include a second sediment chamber having a second baffle, the with tops of the baffles approximately even in elevation to the inflow and outflow pipes, for allowing storm water to pass from the inflow pipe and flow across and into the first sediment chamber, then across the top to the first baffle and then into the second sediment collection chamber, a second inflow deflector adjacent to the top of the first baffle on the downstream side of the first baffle for reducing turbulence of the storm water passing into the second sediment chamber to allow for increased settling and less suspension of pollutant particulates.

The system can further include a third sediment settling chamber between the second baffle and the outflow end of the baffle box for allowing storm water to pass from the second sediment collection chamber, then across the top of the second baffle box and then into the third sediment collection chamber, and a third inflow turbulence deflector adjacent to the top of the second baffle and within the third sediment settling chamber with the baffle box for reducing turbulence of the storm water passing into the third sediment chamber to allow for increased settling and less suspension of pollutant particulates.

The first inflow deflector can include two separate deflectors with a space separating the two deflectors, so that the space is below the inlet port, and the second inflow turbulence deflector and the third inflow turbulence deflectors are each a single elongated deflector.

Furthermore, each of the first inflow deflector and the second inflow deflector and the third inflow deflector are each a single elongated deflector.

The flow spreader can be the same height as the first baffle. The flow spreader can be higher than the height of the first baffle.

A method of increasing pollutant removal efficiencies of a baffle box to prevent further conveyance of the pollutants down stream, can include the steps of deflecting incoming storm water passing into an inlet port of a first sediment chamber of the baffle box with a first inflow deflector in order to block sediment from becoming resuspended in the baffle box, spreading water current wide adjacent to a rear wall of the first sediment chamber of the baffle box to reduce linear velocity of water current, and increasing deposit amounts of the sediment and the particulates being held in a bottom of the first sediment chamber of the baffle box with a first baffle.

The deflecting step can include the step of attaching at least one angled down deflector to an inside wall beneath the inlet port, wherein the angled down deflector increases back pressure within the sediment chamber to reduce volumes of the storm water passing into the baffle box.

The spreading step can include the step of placing a flow spreader onto a central portion of a rear wall of the baffle box beneath the outlet port in order to spread the water current and deflect the water current toward corners where the inflow wall and sides of the baffle box meet.

The method can include the steps of deflecting the incoming storm water passing into a second sediment chamber with a second inflow deflector in order to block the sediment from becoming resuspended in the second chamber, and increasing the deposit amounts of the sediment and the particulates being held in a bottom of the second sediment chamber.

The method can include the steps of deflecting the incoming storm water passing into a third sediment chamber with a third inflow deflector in order to block the sediment from becoming resuspended in the third chamber, and increasing the deposit amounts of the sediment and the particulates being held in a bottom of the third sediment chamber.

The first inflow deflector can be two separate deflectors with a space separating the two deflectors, so that the space is below the inlet port, and the second inflow turbulence deflector and the third inflow turbulence deflectors are each a single elongated deflector. Furthermore, each of the first inflow deflector and the second inflow deflector and the third inflow deflector can each be a single elongated deflector.

The flow spreader can be the same height as the first baffle. The flow spreader can be higher than the height of the first baffle.

Further objects and advantages of this invention will be apparent from the following detailed description of the presently preferred embodiments which are illustrated schematically in the accompanying drawings.

BRIEF DESCRIPTION OF THE FIGURES

FIG. 5 is a perspective view of a baffle box with separate inflow turbulence deflectors, baffle turbulence deflector and flow spreader ready to be installed in the baffle box.

FIG. 6 is a perspective view of the baffle box of FIG. 5 with the novel deflectors and flow spreader installed inside the baffle box.

DESCRIPTION OF THE PREFERRED EMBODIMENTS

Figure 1:
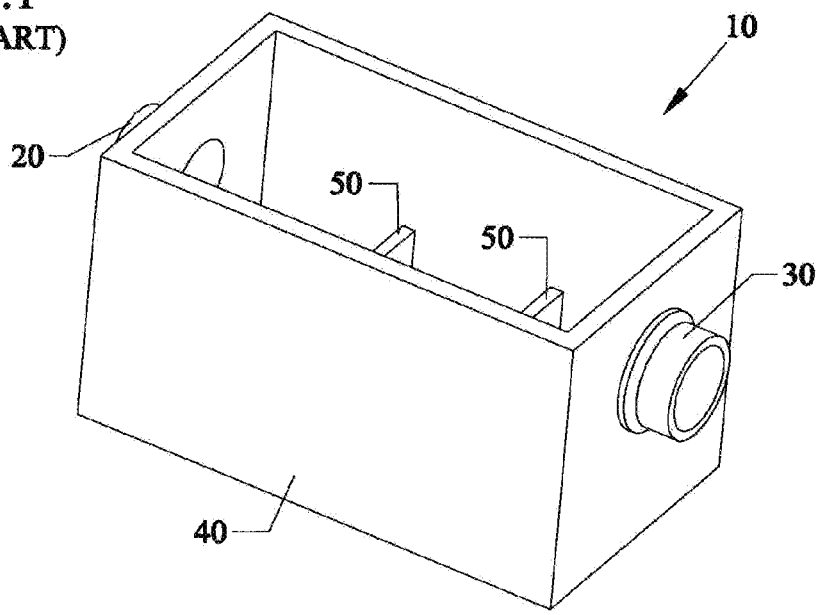
FIG. 1 is an upper perspective view of a conventional baffle box.
Figure 2:
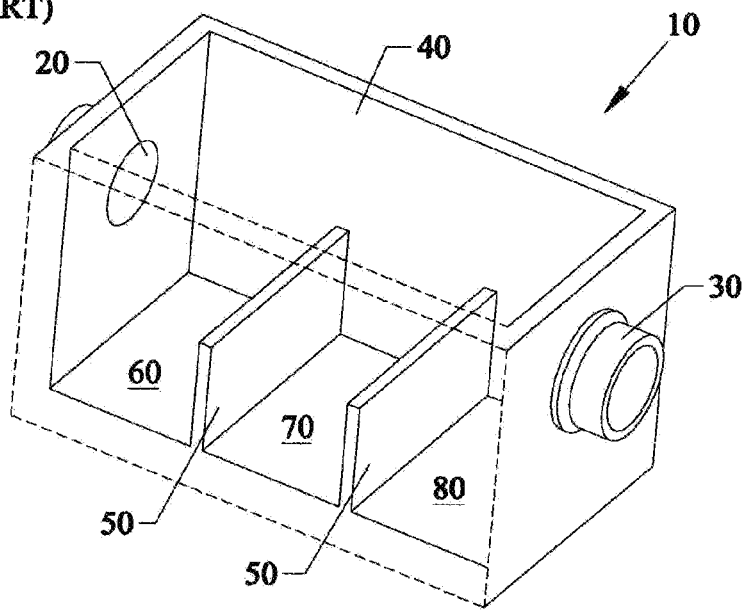
FIG. 2 is another perspective view of the baffle box of FIG. 1 with cut-away face wall.
Figure 3:
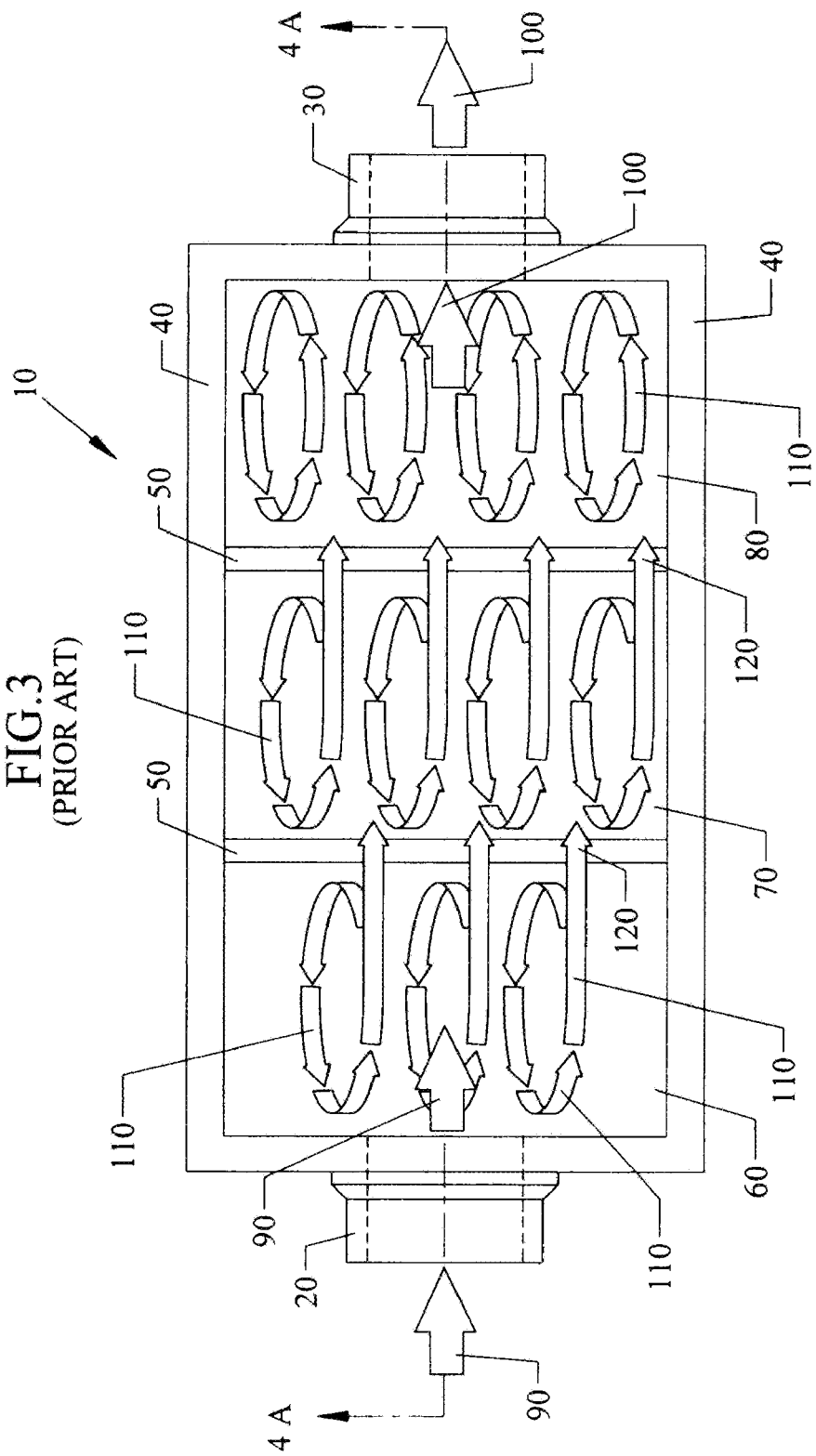
FIG. 3 is a top view of the conventional baffle box of FIGS. 1-2 with water flow lines.
Figure 4:
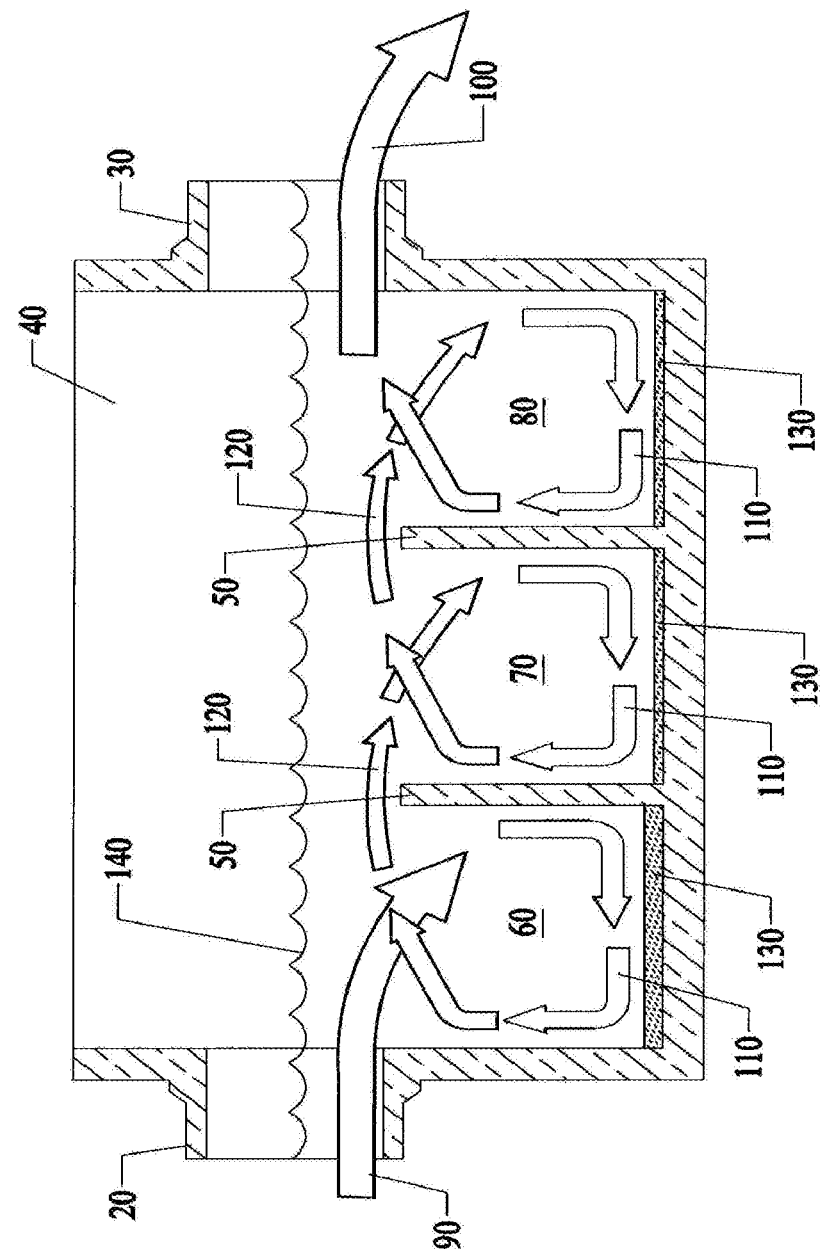
FIG. 4 is a side sectional view of the conventional baffle box 10 of FIG. 3 along arrows 4A with flow lines over baffles and circulating loop currents in the sediment chambers.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The components in the figures will now be described.
10. Conventional baffle box. Prior art.
20. Inflow pipe.
30. Outflow pipe.
40. Baffle box case.
50. Baffle.
60. Sediment chamber 1.
70. Sediment chamber 2.
80. Sediment chamber 3.
90. Water flow into the box.
100. Water flow out of box.
110. Circulating loop currents in sediment chambers.
120. Flow over baffle.
130. Sediment.
140. Possible water level.
150. Right inflow turbulence deflector.
155. Downwardly sloping top surface.
158. Frame
159. Openings for fasteners
160. Left inflow turbulence deflector.
165. Downwardly sloping top surface.
168. Frame
169. Openings for fasteners.
170. Baffle turbulence deflector.
172. Upper flange edge
173. Openings for fasteners
174. Planar rectangular sheet.
176. Lower flange edge adds strength to deflector
180. Flow spreader.
181. Flange end
182. Inwardly bent panel
183. Openings for fasteners
184. Outwardly bent panel
185. Rounded apex top
186. Outwardly bent panel
187. Openings for fasteners
188. Inwardly bent panel
189. Flange end
190. Baffle box with deflectors and flow spreader.
200. Water flow into chamber 1 redirected by flow spreader.
220. Circulating loop currents in sediment chambers 1 & 2 dead-heading into baffle turbulence deflector.
240. Sediment.
250. Closed end of turbulence deflector.
260. Open end of turbulence deflector.
270. Baffle Box with deflectors and optional elongated flow spreader.
280. Elongated flow spreader.
290. Baffle box with standard flow spreader and alternate chamber #1 deflector configuration.

FIG. 5 is a perspective view of a baffle box 10 with separate inflow turbulence deflectors 150, 160 (shown in FIGS. 9-11), baffle turbulence deflector 170 (shown in FIGS. 13-14) and flow spreader 180 (shown in FIGS. 15-16) ready to be installed in the baffle box 10. FIG. 6 is a perspective view of the baffle box 10 of FIG. 5 with the novel deflectors 150, 160 and flow spreader 180 installed inside the baffle box 10.

Figure 7:
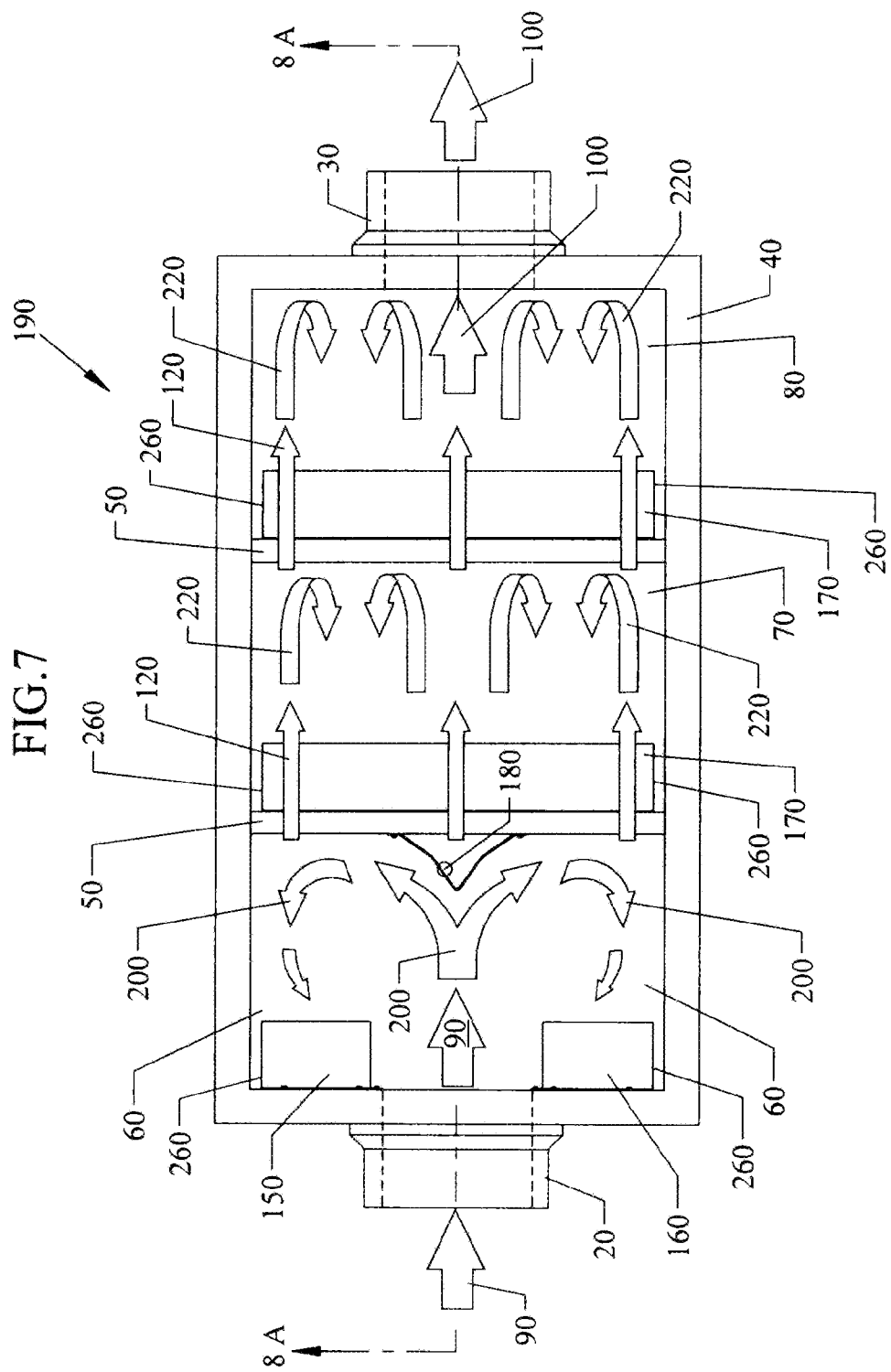
FIG. 7 is a top view of the baffle box with deflectors and flow spreader of FIG. 6 showing water flow through the box and over the baffles.
Figure 8:
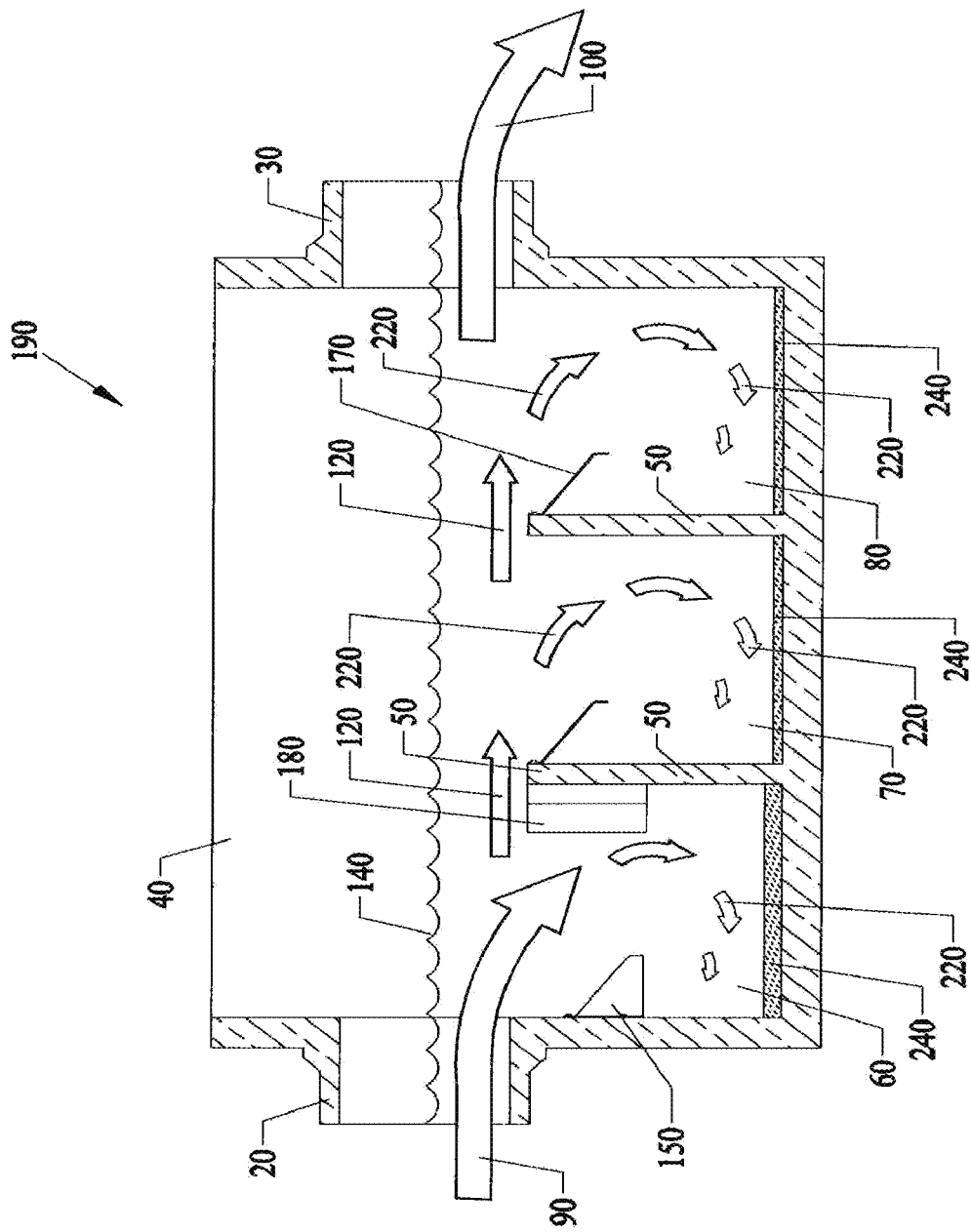
FIG. 8 is a side cross-sectional view of the baffle box with deflectors and flow spreader along arrows 8A of FIG. 7 showing water flow through the box and the baffles.
Figure 9:
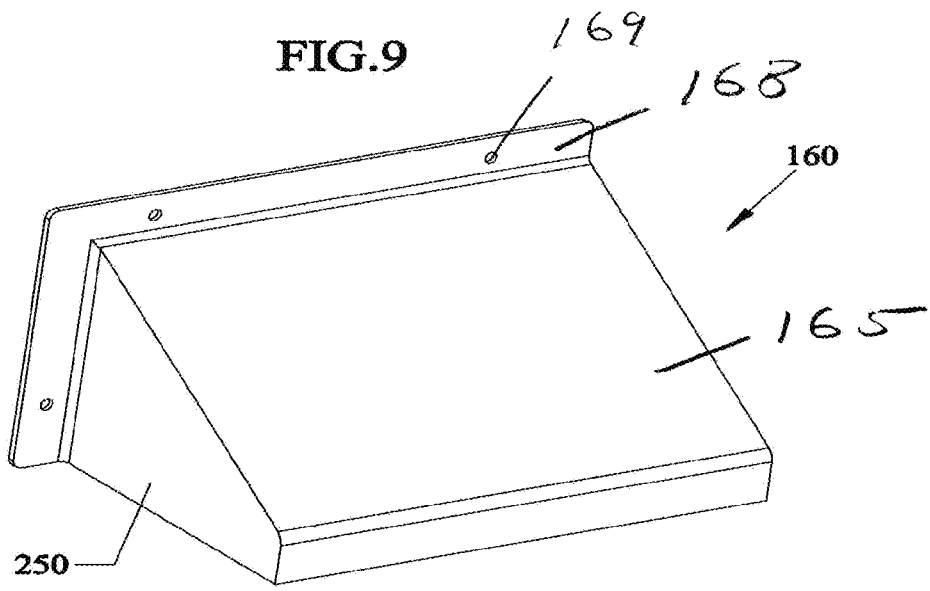
FIG. 9 is a top front perspective view of a left inflow turbulence deflector of FIGS. 5-8.
Figure 10:
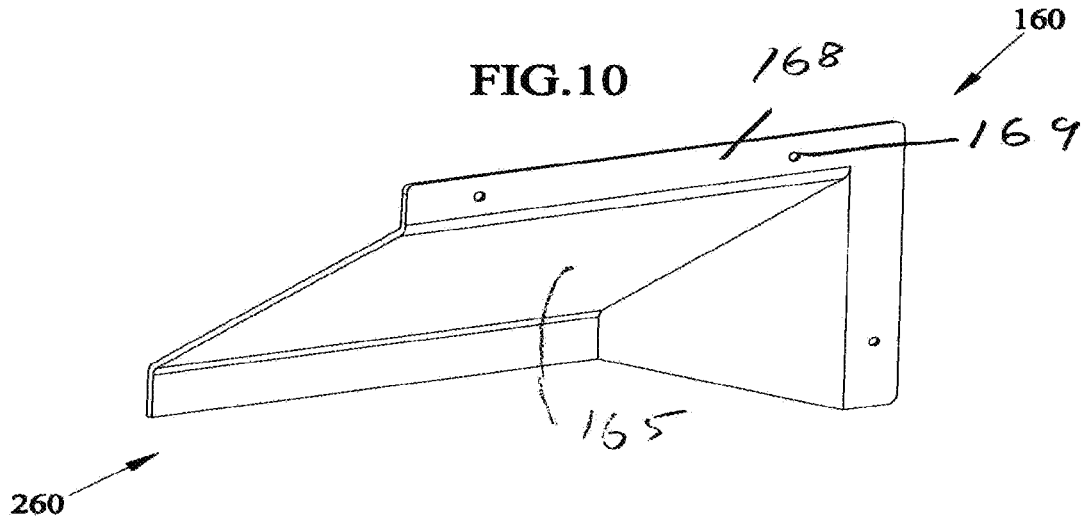
FIG. 10 is a top rear perspective view of the left inflow turbulence deflector of FIG. 9.
Figure 11:
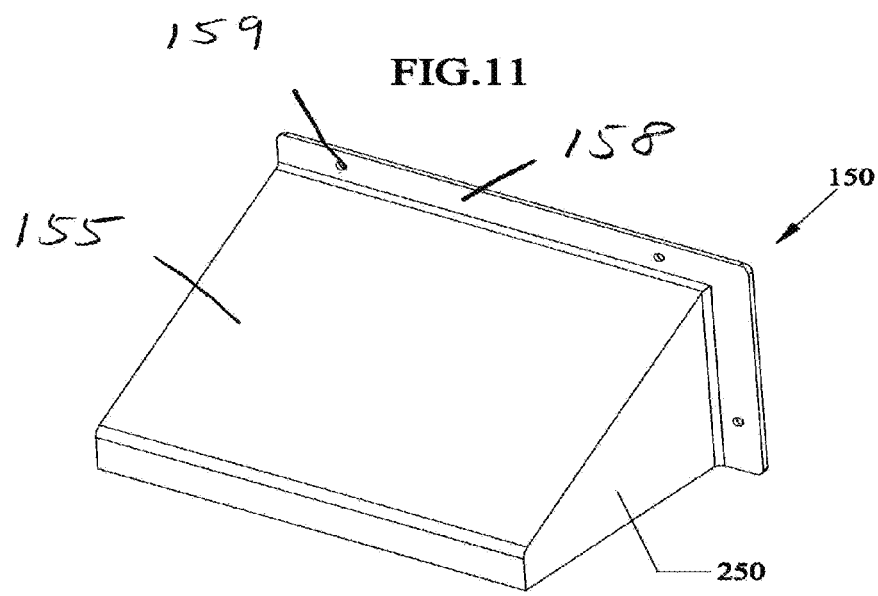
FIG. 11 is a top front perspective view of a right inflow turbulence deflector of FIGS. 5-8.
Figure 12:
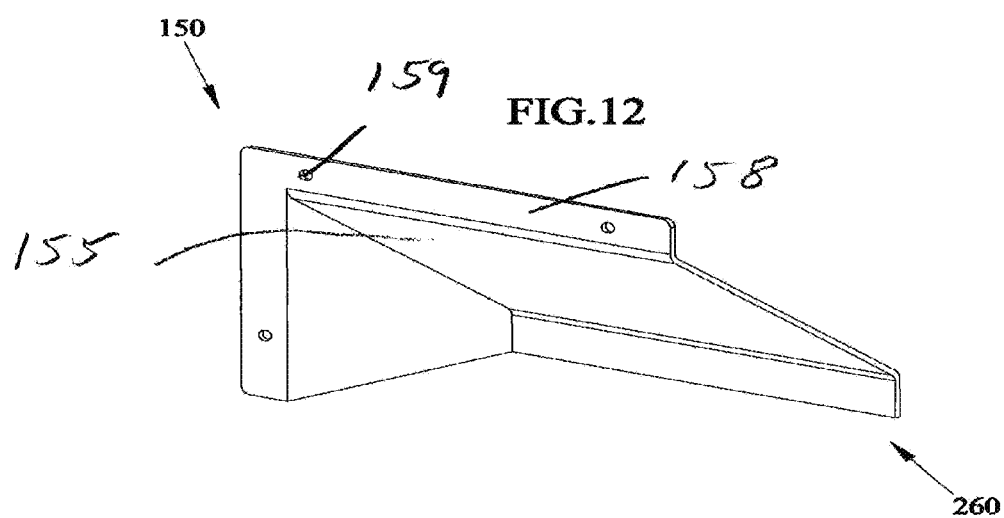
FIG. 12 is a top rear perspective view of the right inflow turbulence deflector of FIG. 11.

FIG. 9 is a top front perspective view of a left inflow turbulence deflector 160 of FIGS. 5-8. FIG. 10 is a top rear perspective view of the left inflow turbulence deflector 160 of FIG. 9. FIG. 11 is a top front perspective view of a right inflow turbulence deflector 150 of FIGS. 5-8. FIG. 12 is a top rear perspective view of the right inflow turbulence deflector 150 of FIG. 11. Each of the deflectors 150, 160 can have downwardly sloping top surfaces 155, 165 with lower flange edge 154, 164 closed ends 250 and open bottom ends 260, and have a triangular appearing side profile.

Referring to FIGS. 5, 6 and 9-12, the right inflow turbulence deflector 150 and the left inflow turbulence deflector 160 can be installed against the front inner wall of the baffle box below and the right and left of the inflow pipe 20. Each deflector 150, 160 can be installed by attaching fasteners (not shown) such as bolts, screws and the like, through openings 159, 169 in the frames 158, 168 about the respective deflectors 150, 160.

Figure 13:
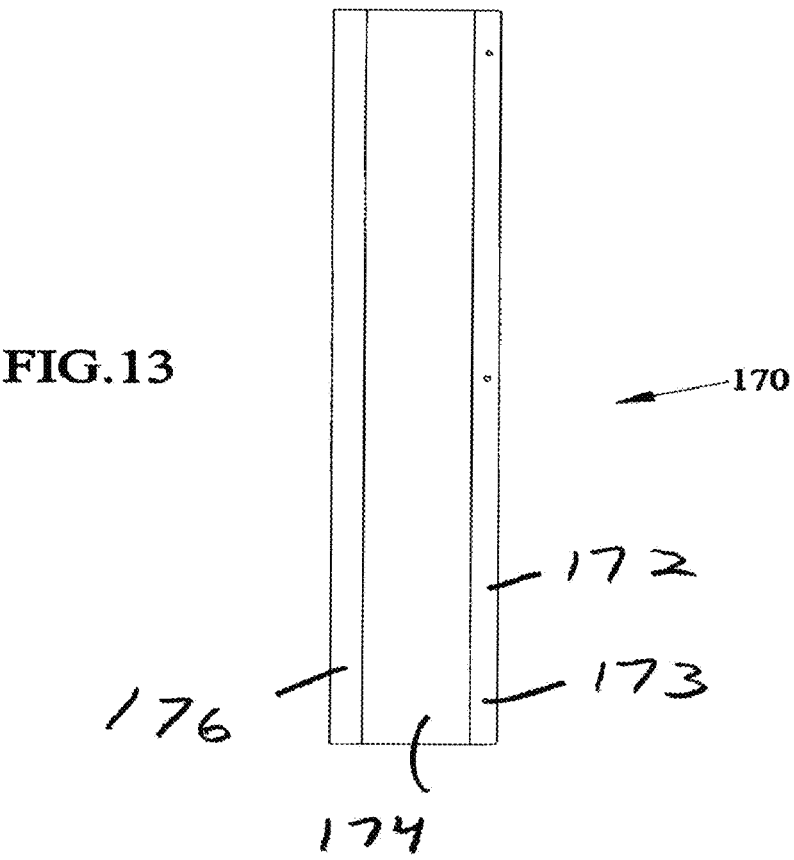
FIG. 13 is a top view of the baffle turbulence deflector of FIGS. 5-8.
Figure 14:
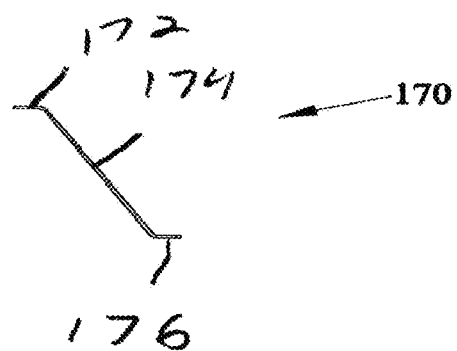
FIG. 14 is a side view of the baffle turbulence deflector of FIGS. 5-8.

FIG. 13 is a top view of the baffle turbulence deflector 170 of FIGS. 5-8. FIG. 14 is a side view of the baffle turbulence deflector 170 of FIGS. 5-8. Referring to FIGS. 5, 6 and 13-14, the baffle turbulence deflector 170 can have a rectangular planar shape 174 with angled flat opposite flange edges 172, 176, and openings in an upper flange edge 172 for allowing fasteners, such as but not limited to bolts and screws to attach, the deflector to outflow sides of baffles 50 inside of the box 10.

Figure 15:
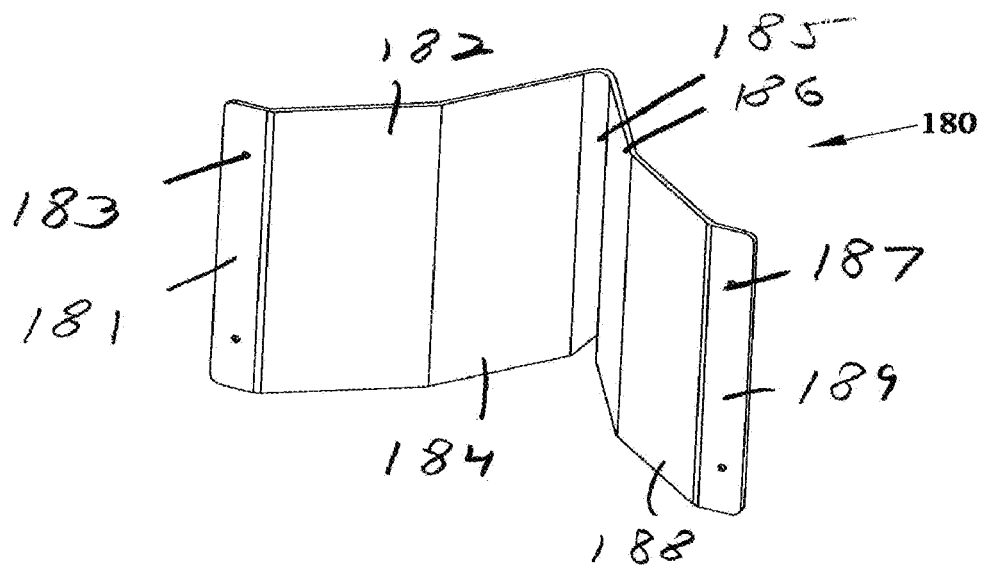
FIG. 15 is a top rear perspective view of the flow spreader of FIGS. 5-8.
Figure 16:
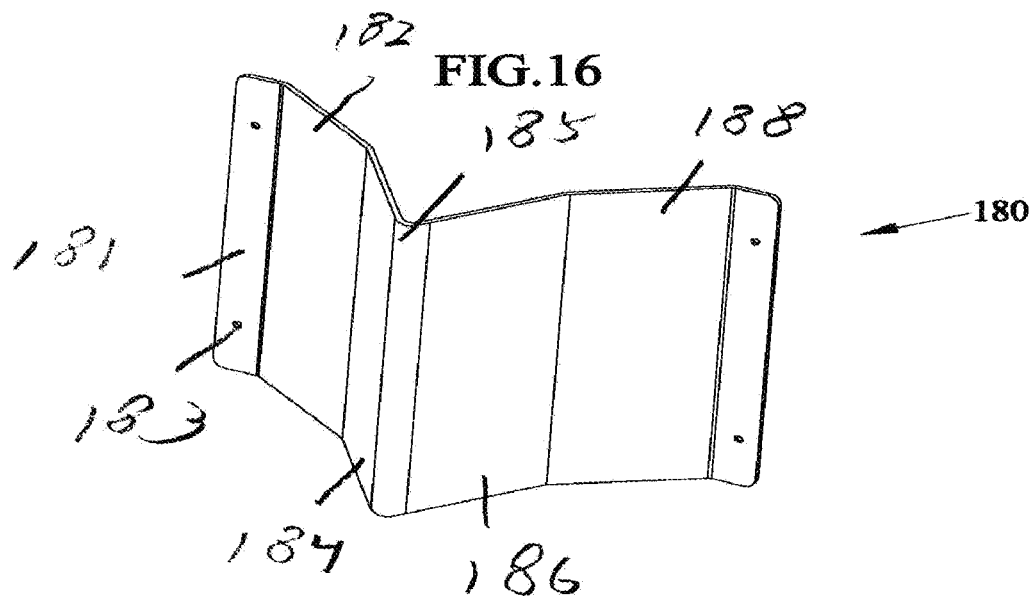
FIG. 16 is a top front perspective view of the flow spreader of FIG. 15.

FIG. 15 is a top rear perspective view of the flow spreader 180 of FIGS. 5-8. FIG. 16 is a top front perspective view of the flow spreader 180 of FIG. 15. Referring to FIGS. 5, 6, and 15-16, the flow spreader(s) 180 can have flat flange ends 181, 189 each with openings 183, 187 for allowing fasteners, such as but not limited to bolts and screws to attach the spreader to the inlet side of the first baffle 50 in the first sediment chamber 60. The spreader(s) 180 can have inwardly bent flat panels 182, 188 that extend up from the flange ends 181, 189, and have upper flat panels 184, 186 that outwardly bend out from panels 182, 188, and meet at a rounded apex 185.

FIG. 7 is a top view of the baffle box 190 with deflectors 150, 160, 170, and flow spreader 180 of FIG. 6 showing water flow through the box and over the baffles 50. FIG. 8 is a side cross-sectional view of the baffle box 190 with deflectors 150, 160, 170 and flow spreader 180 along arrows 8A of FIG. 7 showing water flow through the box and over the baffles 50.

FIG. 7 shows water flow through the box 190 and over the baffles. The flow into first sediment chamber 60 is immediately redirected to flow 200 to the sides of the chamber by the flow spreader 180. The left and right turbulence deflectors 150, 160 break up the circulating loop currents that were previously shown in the conventional baffle box of prior art FIGS. 1-4. In FIG. 7, backpressure 210 created by the turbulence deflectors 150, 160 helps to spread the flow the full width of the chamber 60, reduces turbulence, and reduces the overall velocity of the flow all of which improves sediment settling 240. 220. Circulating loop currents 220 in sediment chambers 60, 70 dead-heading into respective baffle turbulence deflectors 170 in each respective chamber. Flow into the chambers is shown as non-filled arrows 120.

FIG. 8 further shows the flow of water through the chambers 60, 70, 80 and over the baffles 50. FIG. 8 shows the function of the deflectors 150, 160, 170 in breaking up the loop currents. Again, flow into the chambers is illustrated as non-filled arrows and backpressure is illustrated as hatched arrows.

Referring to FIGS. 7-8, backpressure can be created by redirected flow dead-heading into turbulence deflectors 150, 160 in the first chamber 60. The backpressure spreads the flow across the width of the chamber 60, reduces turbulence, and reduces the velocity of the flow, all of which improves sediment settling 140. The turbulence deflectors 150, 160 have a wall on the side closest to the center of the chamber 60 and have no wall nearer the sides of the box 190. There is a space between the sides of the box 190 and the open end of the turbulence deflectors 150, 160 to channel flow away from the center of the box 190 thereby assisting in the widening of the overall flow as well as reducing turbulence under the inflow pipe 20 for improved sediment settling.

Referring to FIGS. 7-8, backpressure can also be created by the circulating loop currents dead-heading into the baffle turbulence deflectors 170 in first and second chambers 60, 70 spread the flow across the width of the chambers 50, 60, reduce turbulence, and reduce the velocity of the flow, all of which improves sediment settling 240. Both ends of the baffle deflectors 170 are open and spaced off of the box walls to facilitate the flow moving toward the sides of the box 190 thereby widening the overall flow.

Figure 17:
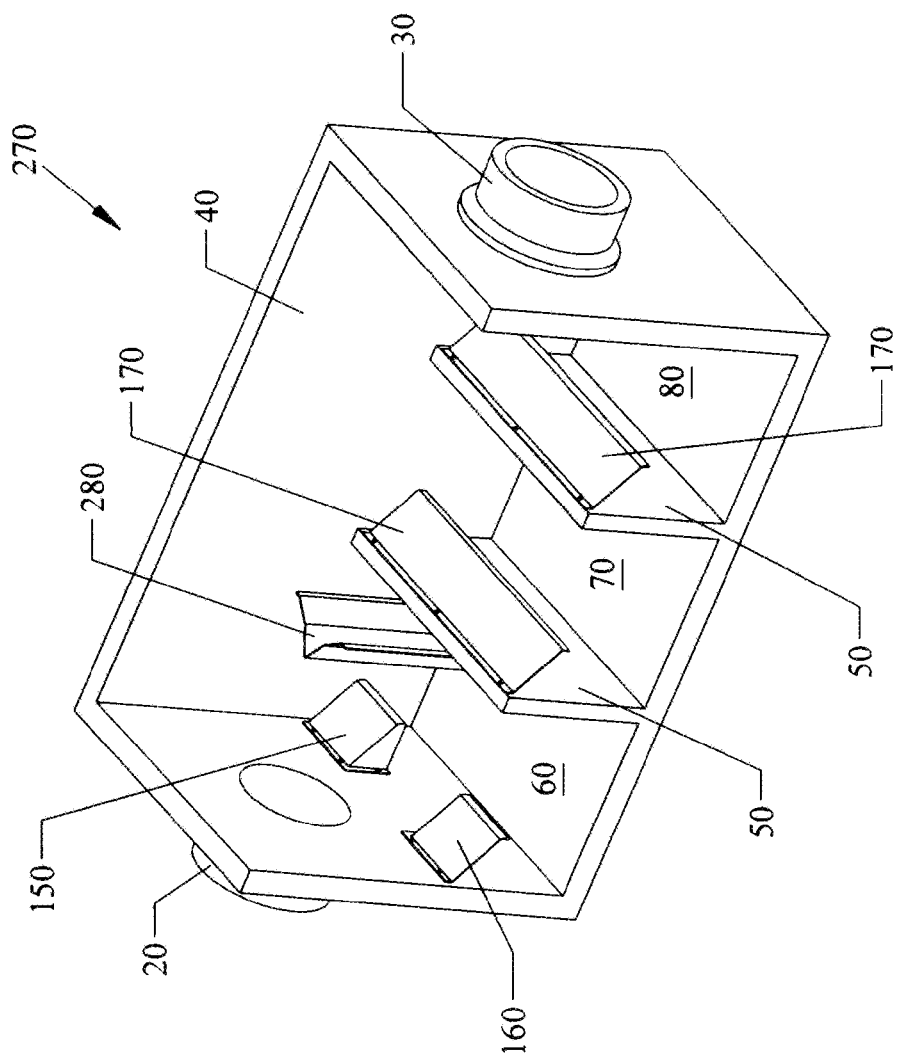
FIG. 17 is a perspective view of baffle box with deflectors and an optional elongated flow spreader.
Figure 18:
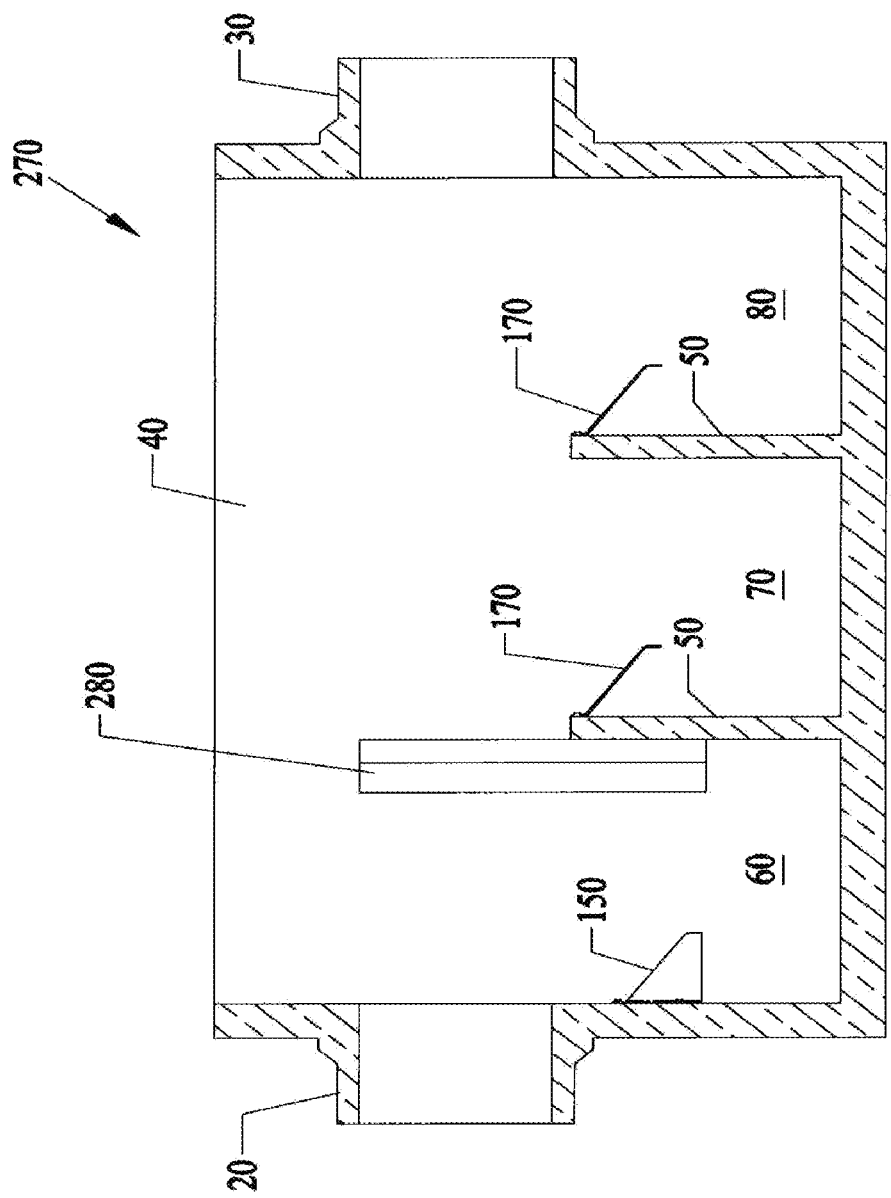
FIG. 18 is a cross-sectional view of the baffle box of FIG. 17.

FIG. 17 is a perspective view of baffle box 270 with deflectors and an optional elongated flow spreader 280. Spreader 280 is similar to but longer than previously described spreader 180. The facing wall of the baffle box is cut away. The top of the elongated flow spreader 280 is co-linear with the top of the inside of the inflow pipe 20 FIG. 18 is a cross-sectional view of the baffle box 270 of FIG. 17 showing the extra height of the elongated spreader 280. The spreader allows for the linear velocity of incoming water to be reduced at the point of the first baffle 50 in the first sediment chamber 60 and increase sediment pickup in the first chamber 60. Spreading the sediment to a wider flow at a reduced velocity increases detention time in the chamber that allows for more time to allow sediment to drop and increase sediment removal efficiency.

Figure 19:
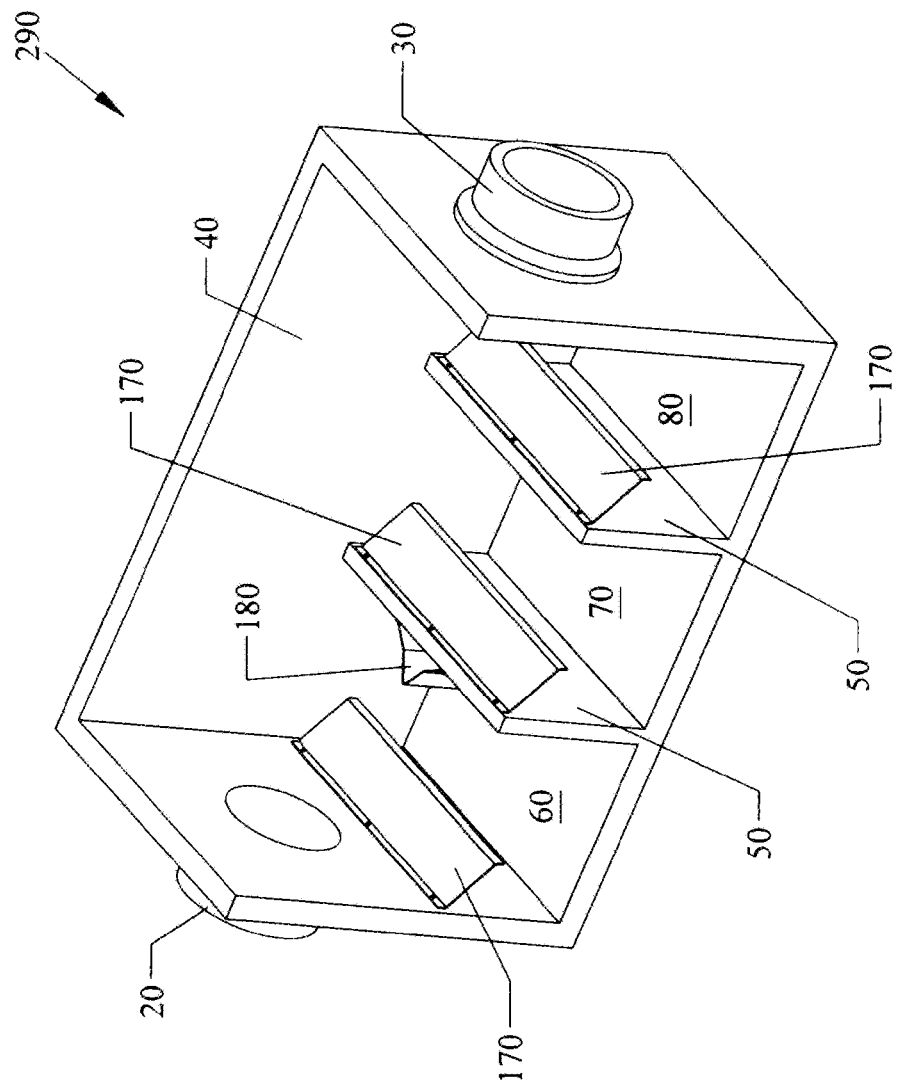
FIG. 19 is a perspective view of the baffle box with deflectors and the standard flow Spreader 180, and single baffle turbulence deflectors in all the chambers.

FIG. 19 is a perspective view of the baffle box 290 with deflectors and the standard flow spreader 180, and single baffle turbulence deflectors 170 in all the chambers 50, 60, 70 This embodiment has had the right and left inflow turbulence deflectors 150, 160 in first chamber 60 replaced with a single baffle turbulence deflector 170 that is the same as the deflector(s) installed on the baffles 50 of the second and third chambers 60, 70. Here, the extra deflector 170 is attached to the inside of the wall of chamber 60 beneath the inlet pipe 20.

The previous embodiments of using two deflectors spaced apart under the inlet pipe allows for larger and heavier sediment particles and debris to drop down the wall and chamber floor space adjacent the wall. Using a single elongated deflector in the first chamber can be preferable when sediment particles are much finer (for example, sand like). The single elongated deflector can eliminate the splash up effects water that can occur with the space that exists between two separate deflectors. The single deflector can enhance the circulation of water. A combination of a high velocity incoming water flow through the inlet pipe along with sediments that are more fine (for example, sand like) would allow for reduced turbulence in the water circulation and increased sediment retention in the sediment chamber when using single elongated deflector.

Referring to FIGS. 5-19, the invention includes apparatus, devices, systems and methods for significantly calming the water and reducing currents within a baffle box 10 to significantly increase the pollutant removal efficiency of this treatment structure. Adding the features of turbulence deflectors 150, 160, 170 in all three sediment chambers 60, 70, 80 and a flow spreader 180 on the wall of the baffle 50 in the first sediment chamber 60 can make a dramatic difference and take the baffle box beyond what is commonly referred to as conventional. Because the first chamber 60 of baffle boxes experience far greater turbulence than the second and third chambers, the greatest increase in the removal efficiency can be achieved by reducing and modifying the turbulence in the first chamber 60.

Adding turbulence deflectors 150, 160 to the wall under the inflow pipe 20 and to the top of each of the downstream sides of the baffles 50 the rectangular current that can form in the sediment chambers can be dramatically reduced. In addition, the turbulence deflectors 150, 160, 170 will physically block sediment from re-suspending and entering back into the water flow passing by above the baffles. Turbulence deflectors 150, 160, 170 create a kind of back pressure within the sediment chambers 60, 70, 80 that reduces the volume of water that can enter the chambers. By reducing the volume of water that can enter the sediment chambers, more efficient settling of particles will be achieved and the potential for re-suspension will be dramatically reduced.

Dealing with the turbulence in the first chamber 60 is different than dealing with the turbulence in the second and third chambers 70, 80. As fast flowing water enters the baffle box 10 from the inflow pipe 20 above the first chamber 60, it is a concentrated current that begins to spread wide and down as it flows across the first sediment chamber 60. When the inflowing current hits against the inflow side of the first baffle 50 it is still relatively concentrated and central within the first sediment chamber 60. By the time the water flow passing through the baffle box reaches the second baffle 50 it has spread wider and is flowing close to the full with of the baffle box 10. Preventing the rectangular current in the second and third chambers 70, 80 is about dealing with water that has spread the full width of the baffle box, while the water current in the first sediment chamber 60 is concentrated and typically within the central approximate ⅓ of the chamber 60.

By placing a flow spreader 180 on the center of the baffle wall in the first chamber 60 the water current is spread and deflected wide toward the corners where the inflow wall and the sides of the baffle box meet. Deflecting and spreading the current wide within the first chamber guides the current away from the area directly below the inflow pipe, greatly reducing the potential to re-suspend sediments from directly below the inflow pipe 20 into the inflowing water. Because the water directly under the inflow pipe 20 is not upwelling, sediments can more easily settle adjacent and directly below the inflow pipe 20, and there is no need for a turbulence deflector directly below the inflow pipe. By not having a turbulence deflector directly under the inflow pipe, a clear path is provided for sediment to settle straight down the wall under the inflow as it enters the baffle box.

By having a left and right turbulence deflectors 150, 160 on the inflow wall in the first chamber 60 a space under the inflow is left open for sediment to settle straight down the inflow wall. The current that has been deflected by the flow spreader will be cut off by the left and right turbulence deflectors. However, to prevent ultra fine sediments from flowing horizontal under the turbulence deflectors 150, 160 toward the inflowing water which is in the center of the baffle box, the turbulence deflectors 170 will be shaped to have a vertical wall on the underside of the deflector adjacent to the inflow, and a gap will be provided between the deflector and the side wall of the baffle box. By shaping the deflector in this way and providing a gap between the deflector and the side wall, any current carrying ultra fine sediments that impact the bottom of the deflector will be conveyed wide toward the sides of the baffle box. This will help to remove ultra fine sediments from turbulence by keeping them away from the inflowing water while maximizing retention time within the baffle box which will increase the removal efficiency of the treatment structure. The turbulence deflector(s) 150, 160, 170 is shaped so that the top of the deflector is angled enough to provide a sufficient slope for particles that settle on top of deflector 150, 160, 170 to slide off and settle into the sediment chamber 50, 60, 70.

By minimizing turbulence within the first sediment chamber 60 the amount of fine and ultra fine sediments captured in the first chamber will increase. Because medium and coarse sediments will not likely pass the first chamber 60, the blend of sediment sizes in the first chamber 60 will have a higher ratio of fine and ultra fine sediments. During higher flow events the medium and coarse sediments will shield the fine and ultra fine sediments from turbulence and further prevent re-suspension of previously captured sediments. In addition, these small particles will have a higher concentration of chemical pollutants than the larger particles. By improving the capture of particles and preventing previously captured particles from re-suspending within the first sediment chamber 60 will significantly increase the overall removal efficiency of the baffle box.

Reducing the turbulence within the second and third sediment chambers 60 70 requires a different approach because the shape of the water flow that influences these chambers is different. As the water flow passes above the second chamber it spreads wider and slightly down into the second chamber, the linear velocity is reduced. The further the water flow moves down the length of the baffle box the more the linear velocity is reduced, however, the flow volume remains the same. As the velocity is reduced so does the turbulence which increased the potential for particles to settle into the sediment chambers.

By the time the flow reaches the second baffle 50 it is close to flowing the full width of the vault (box). The rectangular currents commonly found in the second chamber 70 of a conventional baffle box are going to be dramatically reduced because of the turbulence deflector 170 in the second chamber on the downstream side of the first baffle 50. The portion of water flow that impacts on the upstream side of the second baffle 50 will have a tendency to flow down the face of the baffle 50 and into the second chamber 70 which could possibly initiate the formation of a rectangular current within the chamber 70. However, the turbulence deflector 170 will create static pressure within the chamber 70, and when compared to a conventional baffle box, will significantly reduce the volume of water entering the second chamber. With less turbulence within the chamber there will greater potential for the settling of particles and less potential for scouring. The rectangular current commonly found in conventional baffle boxes will either not be able to form or be dramatically reduced.

The turbulence deflectors 150, 160, 170 will also act as a physical barrier to prevent particles from being introduced back into the water flowing by above the baffles 50. The turbulence deflectors 150, 160, 170 are shaped so that the top of the deflector is angled enough to provide a sufficient slope for particles that settle on top of deflector to slide off and settle into the sediment chamber(s) 50, 60, 70.

As the water flow passes over top of the second baffle 50 and enters the area above the third sediment chamber 80 the linear velocity of the flow is at its slowest. The settling process and hydrodynamics in the third chamber is almost the same as that in the second chamber with one significant difference. In the area above the third sediment chamber 80 adjacent to the outflow, the water flow accelerates and then exits the baffle box.

The invention can work with only a deflector(s) and no spreader in a single baffle box chamber. Alternatively, the invention can work with a single spreader in a first chamber and no deflector. The spreader can be located in the first chamber against the rear baffle (downstream side of the rear wall) of the chamber. The spreader can be located in more than one chamber, such as in a series of the chambers. Likewise the deflector can be in the front chamber and/or the second chamber and/or the third chamber.

The invention can be retrofitted into existing baffle boxes. For example, the invention can be sold in a kit form with the deflectors and/or the spreaders sold separately or in packages for existing baffle boxes. The invention deflectors and/or spreaders can be attached by fasteners such as but not limited to bolts, screws, and the like.

The invention has been tested and passed standards such as those from the State of New Jersey. Testing has also shown that up to approximately 300% increased sediment retention occurs when using the novel deflectors and spreaders of the invention.

While the deflectors are generally shown as having top surfaces that that are angled and incline downward, the top surfaces of the deflectors can also be substantially horizontal.

The deflectors and spreaders can be formed from materials such as but not limited to molded plastic, fiberglass, resin, composites, metals, combinations, thereof, and the like. The deflectors and flow spreaders can be made from aluminum, stainless steel, galvanized metal.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A system for increasing efficiencies of storm water baffle boxes to remove pollutants, comprising:
    a baffle box having a first sediment settling chamber with a first baffle, with a raised inlet port adjacent to a front wall of the baffle box for allowing storm water to pass into the baffle box, and a second sediment chamber with;
    an inflow deflector in the first sediment chamber adjacent to the inlet portion of the baffle box beneath the inlet port for reducing turbulence of the storm water passing into the sediment chamber to allow for increased settling and less suspension of pollutant particulates; and
    a flow spreader in the first sediment chamber adjacent to the first baffle for spreading water flow in a wide direction within the baffle box to reduce linear velocity of the flow of the storm water; and
    a raised outlet port adjacent to a rear wall of the baffle box for passing flow from the storm water to pass out of the baffle box.

2. The system of claim 1, wherein the inflow deflector includes:
    a pair of angled down deflectors on both sides of the inlet port.

3. The system of claim 1, wherein the flow spreader includes:
    a triangular configuration.

4. The system of claim 1, further comprising:
    a second baffle in the second sediment chamber, the with tops of the baffles approximately even in elevation to the inflow and outflow pipes, for allowing storm water to pass from the inflow pipe and flow across and into the first sediment chamber, then across the top to the first baffle and then into the second sediment collection chamber; and
    a second inflow deflector adjacent to the top of the first baffle on the downstream side of the first baffle for reducing turbulence of the storm water passing into the second sediment chamber to allow for increased settling and less suspension of pollutant particulates.

5. The system of claim 4, further comprising:
    a third sediment settling chamber between the second baffle and the outflow end of the baffle box for allowing storm water to pass from the second sediment collection chamber, then across the top of the second baffle box and then into the third sediment collection chamber; and
    a third inflow turbulence deflector adjacent to the top of the second baffle and within the third sediment settling chamber with the baffle box for reducing turbulence of the storm water passing into the third sediment chamber to allow for increased settling and less suspension of pollutant particulates.

6. The system of claim 5, wherein the first inflow deflector includes two separate deflectors with a space separating the two deflectors, so that the space is below the inlet port, and the second inflow turbulence deflector and the third inflow turbulence deflectors are each a single elongated deflector.

7. The system of claim 5, wherein each of the first inflow deflector and the second inflow deflector and the third inflow deflector are each a single elongated deflector.

8. The system of claim 1, wherein the flow spreader is the same height as the first baffle.

9. The system of claim 1, wherein the flow spreader is higher than the height of the first baffle.

10. A method of increasing pollutant removal efficiencies of a baffle box to prevent further conveyance of the pollutants down stream, comprising the steps of:
    deflecting incoming storm water passing into an inlet port of a first sediment chamber adjacent to a front wall of the baffle box with a first inflow deflector in order to block sediment from becoming resuspended in the baffle box;
    spreading water current wide adjacent to a first baffle in the first sediment chamber of the baffle box to reduce linear velocity of water current;
    increasing deposit amounts of the sediment and the particulates being held in a bottom of the first sediment chamber of the baffle box with the first baffle;
    allowing the storm water to pass across the top to the first baffle and then into a second sediment collection chamber; and
    passing flow from the storm water to pass out of the second collection chamber and out of the baffle box through a raised outlet port adjacent to a rear wall of the baffle box.

11. The method of claim 10, wherein the deflecting step includes the step of:
    attaching at least one angled down deflector to an inside wall beneath the inlet port, wherein the angled down deflector increases back pressure within the sediment chamber to reduce volumes of the storm water passing into the baffle box.

12. The method of claim 11, wherein the spreading step includes the steps of:
    placing a flow spreader onto a central portion on the first baffle of the baffle box in order to spread the water current and deflect the water current toward corners where the inflow wall and sides of the baffle box meet.

13. The method of claim 12, further comprising the steps of:
    deflecting the incoming storm water passing into the second sediment chamber with a second inflow deflector in order to block the sediment from becoming resuspended in the second chamber; and
    increasing the deposit amounts of the sediment and the particulates being held in a bottom of the second sediment chamber.

14. The method of claim 13, further comprising the steps of:
    deflecting the incoming storm water passing into a third sediment chamber with a third inflow deflector in order to block the sediment from becoming resuspended in the third chamber; and
    increasing the deposit amounts of the sediment and the particulates being held in a bottom of the third sediment chamber.

15. The method of claim 14, wherein the first inflow deflector includes two separate deflectors with a space separating the two deflectors, so that the space is below the inlet port, and the second inflow turbulence deflector and the third inflow turbulence deflectors are each a single elongated deflector.

16. The system of claim 14, wherein each of the first inflow deflector and the second inflow deflector and the third inflow deflector are each a single elongated deflector.

17. The method of claim 10, wherein the flow spreader is the same height as the first baffle.

18. The method of claim 10, wherein the flow spreader is higher than the height of the first baffle.

19. A system for increasing efficiencies of storm water baffle boxes to remove pollutants, comprising:

a baffle box divided into at least two sediment settling chambers by a baffle, with a raised inlet port in the first chamber for allowing storm water to pass into the baffle box, and a raised outlet port in the second chamber for passing flow from the storm water to pass out of the baffle box;

a pair of inflow deflectors on both sides of the inlet port adjacent to the inlet portion of the baffle box beneath the inlet port for reducing turbulence of the storm water passing into the sediment chamber to allow for increased settling and less suspension of pollutant particulates; and a flow spreader in the box for spreading water flow in a wide direction within the baffle first chamber adjacent to the baffle to reduce linear velocity of the flow of the storm water.

20. A method of increasing pollutant removal efficiencies of a baffle box to prevent further conveyance of the pollutants down stream, comprising the steps of:

deflecting incoming storm water passing into an inlet port of a first sediment chamber of the baffle box with spaced apart deflectors in order to block sediment from becoming resuspended in the baffle box, the spaced apart deflectors being located such that the space is below the inlet port;

spreading water current wide adjacent to a first baffle forming a rear wall of the first sediment chamber of the baffle box to reduce linear velocity of water current; and increasing deposit amounts of the sediment and the particulates being held in a bottom of the first sediment chamber of the baffle box.

\* \* \* \* \*